(12) United States Patent
Bousquet et al.

(10) Patent No.: US 8,939,380 B1
(45) Date of Patent: Jan. 27, 2015

(54) METHODS AND APPARATUS FOR ESTABLISHING ELECTRICAL CONNECTIONS TO A RAILROAD RAIL

(71) Applicant: BNSF Railway Company, Fort Worth, TX (US)

(72) Inventors: Mark E. Bousquet, Fort Worth, TX (US); Kurt D. Harmon, Torrington, WY (US)

(73) Assignee: BNSF Railway Company, Fort Worth, TX (US)

( * ) Notice: Subject to any disclaimer, the term of this patent is extended or adjusted under 35 U.S.C. 154(b) by 46 days.

(21) Appl. No.: 13/667,081

(22) Filed: Nov. 2, 2012

(51) Int. Cl.
*B60M 5/00* (2006.01)

(52) U.S. Cl.
CPC ...................................... *B60M 5/00* (2013.01)
USPC ...................................... 238/14.2; 238/14.05

(58) Field of Classification Search
CPC ........................................................ B60M 5/00
USPC ......... 238/14.05, 14.2, 14.4, 14.6, 14.7, 14.9, 238/14.12, 14.13, 14.14; 439/110, 527, 439/865, 121
See application file for complete search history.

(56) References Cited

U.S. PATENT DOCUMENTS

| 285,494 A * | 9/1883 | Grande ........................ 238/14.6 |
| 8,480,414 B2 * | 7/2013 | Carnevale et al. .............. 439/97 |

* cited by examiner

*Primary Examiner* — Mark Le
(74) *Attorney, Agent, or Firm* — James J. Murphy; Thompson & Knight LLP

(57) ABSTRACT

A method of making an electrical connection to a railroad rail includes fastening a wire bonding assembly to a railroad rail, the wire bonding assembly including first and second spaced apart washer plates contacting the rail and a metal bar supported by the washer plates. The metal bar is electrically connected with the rail with a first conductive lead contacting a selected point on the rail and a selected point on the metal bar. A second conductive lead is connected to another selected point on the metal bar for establishing an electrical connection to the rail from an electrical device.

19 Claims, 3 Drawing Sheets

METHODS AND APPARATUS FOR ESTABLISHING ELECTRICAL CONNECTIONS TO A RAILROAD RAIL

FIELD OF INVENTION

The present invention relates in general to railroad equipment, and in particular, to methods and apparatus for establishing electrical connections to a railroad rail.

BACKGROUND OF INVENTION

Track circuits have been used by the railroads for many years. Generally, each of a pair of rails of a block of track is connected to terminals of opposite polarity of an electrical power source. These connections are normally made on the respective rails near the insulated joints separating one end of the track block with the end of the neighboring track block. The rails are also respectively connected, near the insulated joints at the other end of the block, to opposing terminals of the coil of a relay. Signal flow through the relay, under the control of the relay coil, is monitored by associated monitoring equipment, which in turn sets signal aspects, transmits messages to dispatchers, and so on.

In a typical track circuit, when the block of track is clear (i.e., no locomotive or railcars are contacting the rails within the block), current through relay coil is sufficient to keep the relay closed and allow signal flow to the monitoring equipment, which processes the signal flow as a clear condition. On the other hand, when a locomotive and/or railcar is within the track block, the metal wheels and axels create an electrical shunt between the rails, which reduces the current flow though the relay coil and breaks the relay signal path. The break in the signal path indicates an occupied block to the monitoring equipment. A similar situation occurs in the case of a break in a rail, which breaks current flow through the relay coil and opens the relay.

While track circuits have been known in the railroad sector for many years, their implementation still presents significant challenges. One particular challenge is making, removing, and replacing solid electrical connections to the rails without causing potentially hazardous damage to the rails themselves.

SUMMARY OF INVENTION

According to one embodiment of the principles of the present invention, a method of making an electrical connection to a railroad rail is disclosed including fastening a wire bonding assembly to a railroad rail, the wire bonding assembly including first and second spaced apart washer plates contacting the rail and a metal bar supported by the washer plates. The metal bar is electrically connected with the rail with a first conductive lead contacting a selected point on the rail and a selected point on the metal bar. A second conductive lead is connected between another selected point on the metal bar for establishing an electrical connection to the rail and a selected electrical device.

Embodiments of the present principles provide significant advantages over the prior art practice of welding or brazing electrical connections directly to the web of railroad rails. Specifically, because most of the work of making electrical connections is now performed on a wire bonding assembly, damage to the rails themselves is substantially reduced, particularly when cables and wires must be disconnected and reconnected at a given site. Among other things, conventional welding and brazing, along with the associated surface preparation, can be performed directly on the bonding wire assembly, without having to avoid areas on the rail encompassing prior welding or brazing points, holes, or brands. Connections can be broken from the wire bonding assembly using a hammer or chisel. When damaged, the wire bonding assembly is significantly safer, easier and less expensive to replace than rail and rail joints.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
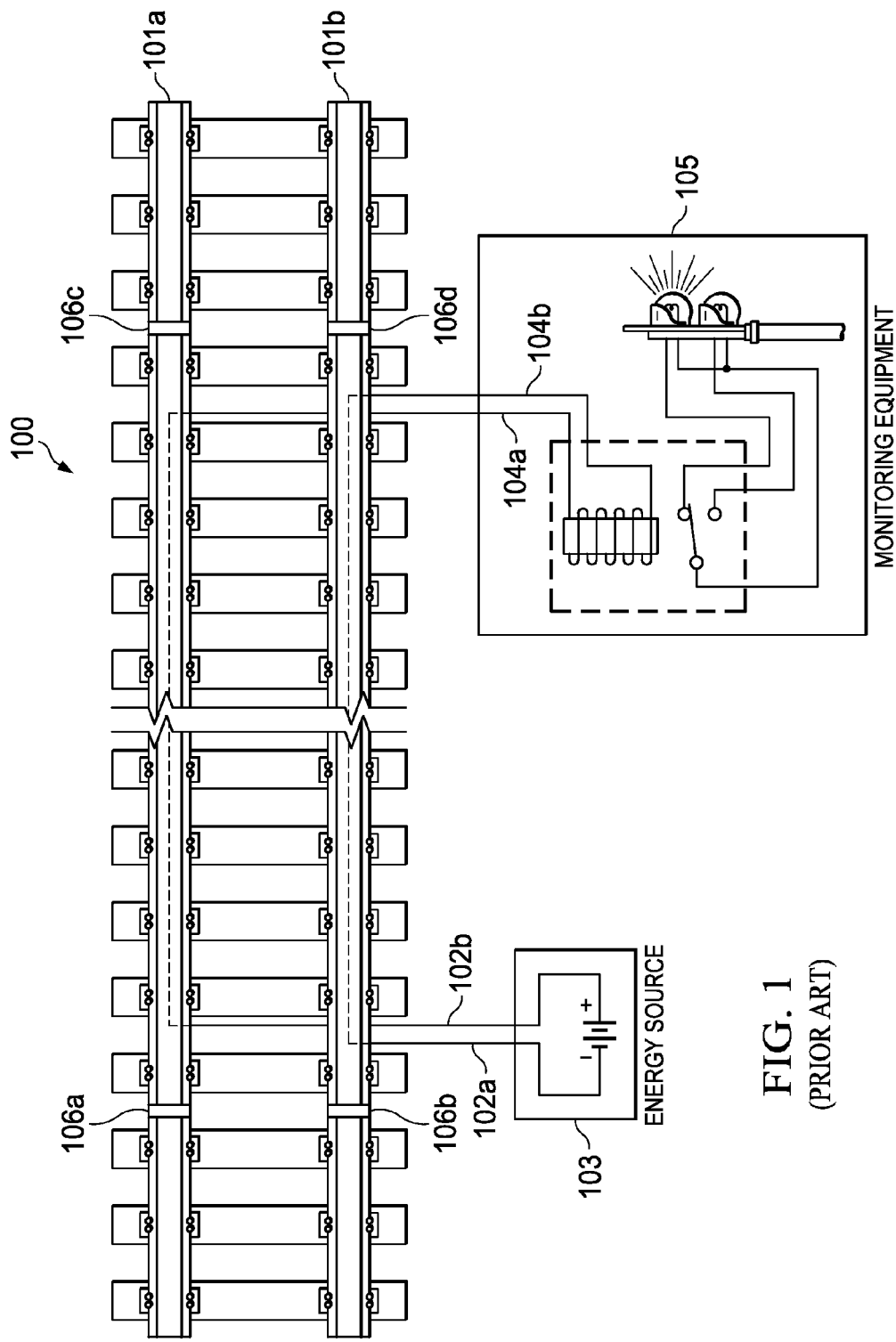
FIG. 1 is high-level diagram illustrating a small portion of a block of railroad track and associated track circuitry suitable for describing a typical application of the principles of the present invention.
Figure 2:
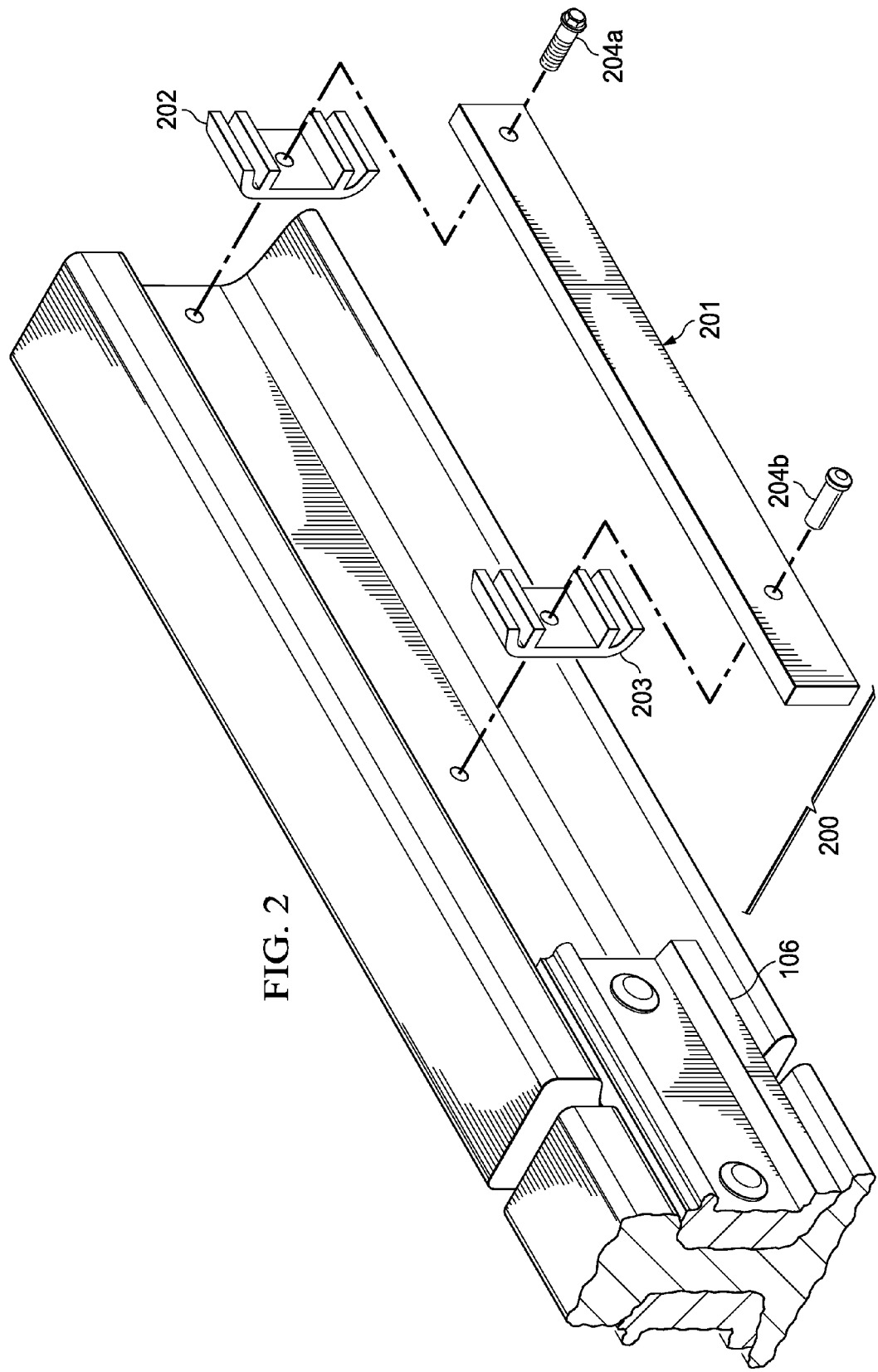
FIG. 2 is an exploded view showing a wire bonding plate assembly, along with a corresponding portion of a rail, according to one embodiment of the principles of the present invention.
Figure 3:
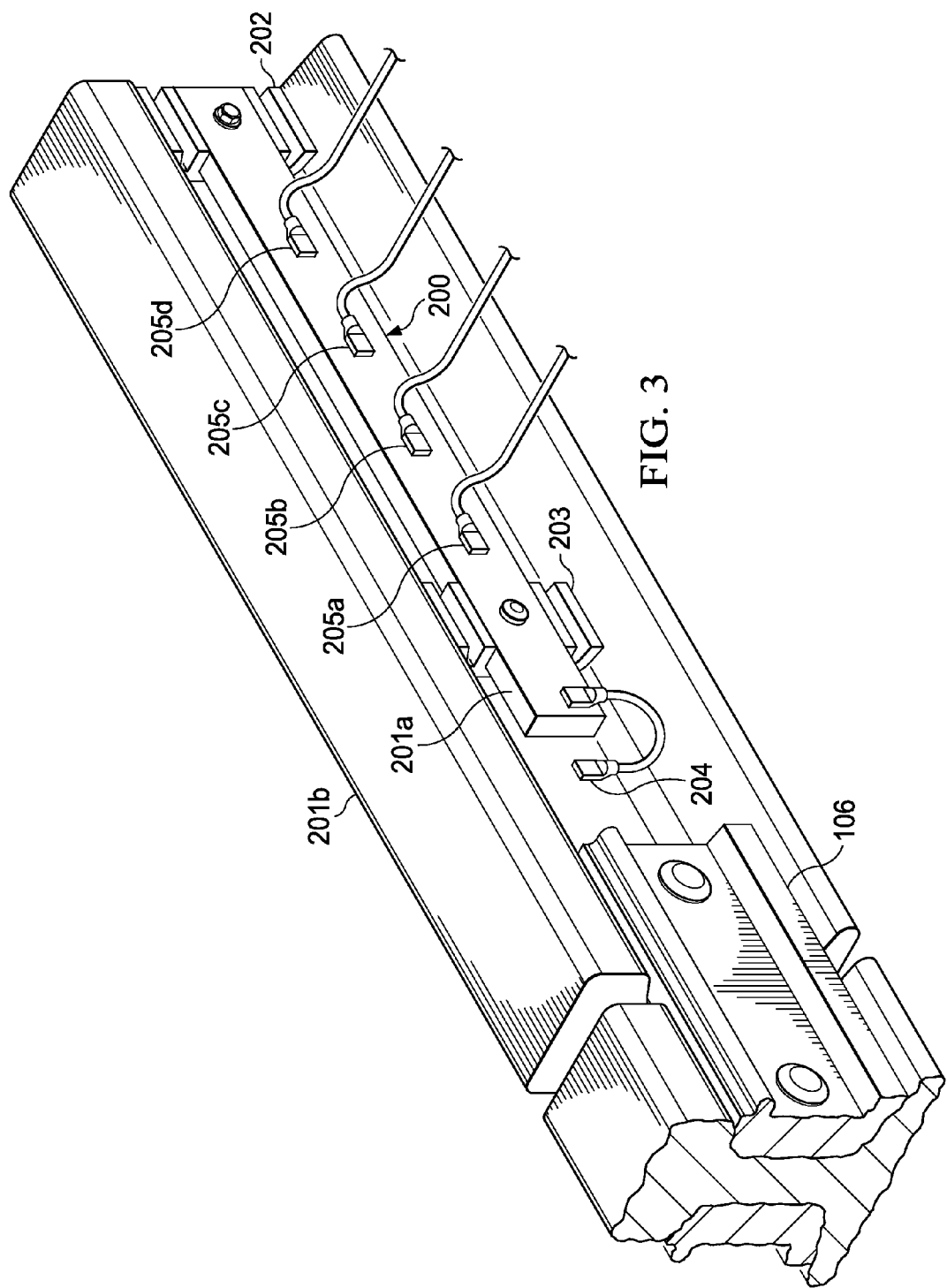
FIG. 3 is a diagram showing a representative configuration of the wire bonding plate assembly shown in FIG. 2 for establishing on or more electrical connections to a rail.

The principles of the present invention and their advantages are best understood by referring to the illustrated embodiment depicted in FIGS. 1-3 of the drawings, in which like numbers designate like parts.

FIG. 1 is a diagram of small portion of a block 100 of railroad track including a pair of conventional parallel steel railroad rails 101a and 101b. Block 100 is associated with conventional track circuit equipment including an electrical energy source 103 connected to rails 101a and 101b through a corresponding pair of track wires 102a and 102b. Track wires 102a and 102b are connected to terminals of opposite polarity on electrical energy source 103 to create current flow through rails 101a and 101b when a closed circuit is maintained. While electrical energy source 103 is shown as a conventional direct current (DC) electrical source suitable for track circuit applications, electrical energy source 103 can also be a conventional alternating (AC) electrical source, as known in the art.

The circuit is monitored at the other end of track block 100 by a conventional track monitoring system 105 connected to rails 101a and 101b through a corresponding set of track wires 104a and 104b. For illustrative purposes, track wires 104a and 104b are shown coupled to opposing terminals of the coil of a relay that controls a signal, although in actual practice, monitoring equipment 105 can be any one of a number of different track monitoring systems known in the art.

In conventional track circuit systems, track wires 102a-102b and 104a-104b are connected directly to the corresponding rails 101a-104a at the corresponding insulated joints 106a-106d, which separate track block 100 from the neighboring track blocks. The electrical connections to rails 101a-101b are typically kept as close as possible to the insulated joints 106a-106d (e.g., 3 inches), given that a break in a rail between the insulated joint and an associated electrical connection will not break the closed electrical circuit and therefore will not be detected. While only track wires 102a-102b and 104a-104b for a track circuit are shown in FIG. 1 as an example, other types of electrical connections such as PSO, crossing, or shunt/coupling wires, are also commonly made to rails 101a-101b.

Track circuit electrical connections are conventionally implemented by exothermic welding or pin-brazing track wires 102a-102b and 104a-104b directly to the rail using specified procedures. For example, the rail surfaces to be welded are cleaned of contamination that might interfere with an effective weld. Surface cleaning may include wiping away dirt or grease with mineral spirits, warming the area with a propane torch to drive out residual moisture, and grinding to remove contaminants such as rust. When grinding is required, care must be taken to ensure that no more metal than necessary is removed and that the surface is not scratched, which can initiate a rail crack.

The track wire is then typically exothermically welded or pin-brazed to the web of the rail within the limits of insulated joints 106a-106d. When multiple electrical track connections are being made close to an insulated joint, the first connection must be made with a maximum clearance (e.g., 3 inches) from the joint bar, after which the remaining connections are made with certain a clearance between them (e.g., 2 inches). Typically, track wires 102a-102b and 104a-104b for the track circuit are connected closest to the associated insulated joint 106a-106d, with other types of connections, such as PSO, crossing, or shunt/coupling wires being made furthest from the corresponding insulated joint 106a-106d. Connections can be made to both sides of the rail, in which case they are staggered.

While the areas of the rails where electrical connections can be made are limited, new connections also cannot be made over a location that contained an earlier connection, since the heat created by welding or brazing may cause microcracks in the martensic shell in the steel at the location where the earlier connection was made. (Martenization is generally a process where a hard crystalline structure is created in the steel by the application of high external heat to a local area, e.g., during welding or high-temperature brazing, followed by rapid cooling as mass of the rail sinks heat. This hard crystalline structure can lead to fatigue cracking and rail fracture.)

Similarly, bonds to the web of the rail must avoid areas around track connection holes, which are already considered "stress risers" and may have imperfections that could propagate due to the application of welding or brazing heat. Additionally, connections to the web of the rail must also avoid the area of the rail brand, on either side of the rail.

Care must also be taken when removing a bond or track connection weld from the web of a rail. For example, breaking off a weld using a hammer or chisel could tear out rail material and initiate a crack in the rail structure. Generally, the use of any tool that might score or notch the rail cannot be used to avoid future rail fractures.

FIG. 2 is an exploded view showing a wire bonding plate assembly 200, and an associated portion of a rail 101, according to one embodiment of the principles of the present invention. Wire bonding plate assembly 200 includes a metal bar or strap 201, which is formed, for example, from steel. A pair of washer plates 202 and 203 support bar 201 on the web between the base and the head of rail 101. In the embodiment shown in FIG. 2, metal bar 201 and washer plates 202 and 203 are fastened to rail 101 using a bolt under the trademark HUCKBOLT, although in alternate embodiments other forms of fastening can be used, such as welding or brazing.

In FIG. 3, wire bonding plate assembly 200 is shown in a representative application. Typically, one (1) bonding plate assembly 200 is attached to each side of the web of each rail 101a and 101b close to insulated joints 106a-106d. In other words, four (4) bonding plate assemblies 200 are preferably used at each end of each track block, such as track block 100.

A first tab at one end of a conductive bonding wire 204 is fastened to the corresponding rail 101, preferably using a technique such as the STANLEY SAFEBOND process (i.e., pin brazing), which minimizes damage to the rail, although welding, brazing, or bolting can also be used, as appropriate. Preferably, this connection is made very close to associated insulated joint 106, for example within three (3) inches. Bonding wire 204 is of any suitable construction and gauge sufficient to carry the required electrical current.

A second tab at the opposing end of bonding wire 204 is fastened to a nearby surface of metal bar 201a, which in the example shown in FIG. 3, is the outer (major) surface of metal bar 201. The connection between the second end of bonding wire 204 and metal bar 201 is preferably made using the STANLEY SAFEBOND pin brazing process, although welding, brazing, or bolts may also be used, given that damage to the rail itself is not at stake.

Although a single connection between the rail web and metal bar 201 through a single bonding wire 204 has the advantage of minimizing potential damage to the rail, the principles of the present invention do not foreclose on multiple rail to wire bonding assembly connections. Additionally, by minimizing the gap between the end of metal bar 201 and the insulation joint 106, the exposure of bonding lead 204 is minimized. Furthermore, a connection of bonding lead 204 to the backside of metal bar 201 affords further protection.

For illustration purposes, four (4) track wire to bonding assembly connections 205a-205d are shown, although the actual number may vary from application to application. Connections 205a-205d are made to, for example, one of the track wires 102a-102b and 104a-104b shown in FIG. 1 for track circuits, PSO wires, crossing wires, shunt/coupling wires, and other electrical connections to rails 101a and 101b. Connections 205a-205d can be made using conventional techniques, including the STANLEY SAFEBOND pin brazing process, welding, brazing, or bolts.

In the illustrated embodiment, washer plate 202 is preferably insulated, although washer plate 203 may be either insulated or conductive. Advantageously, when washer plate 202 is insulated and metal bar 201 breaks between bonding wire 204 and a connection 205a-205d, an open electrical circuit results, which can be detected by track monitoring circuitry 105 of FIG. 1 and a signal put into a most safe condition.

Bonding plate assembly 200 realizes significant advantageous over the existing practice of welding or brazing electrical connections directly to the rails. Generally, work can be performed directly on metal bar 201 of wire bonding assembly 200 without concerns about damage to the rails themselves. If the metal bar 201 is damaged or fractured due to repeated connections or disconnections, metal bar 201 is simply replaced. Among other things, the efforts required to avoid welding or brazing over holes, brands, and the locations of a previous welding or brazing, is eliminated. Potentially damaging preparation of the welding surface, especially grinding, is also no longer a significant factor. Connections can also be broken, for example with a hammer or chisel, without the risk of damaging the rail web.

Overall, the need to replace damaged rail and rail joints is substantially reduced, which in turn reduces train delays, product costs, and man hours, and increases both track and maintenance personnel safety.

It should be recognized that establishing track wire connections near insulated joints 106a-106d of a track block 100 are only one possible application of wire bonding plate 200.

Similar advantages can be realized by employing wire bonding plate 200 where other types of electrical connections are required by a railroad, including those at switch points, stock rails, ridged frogs, swing nose frogs, and fuel facility grounds.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of making an electrical connection to a railroad rail comprising:
   fastening a wire bonding assembly to a railroad rail, the wire bonding assembly including first and second spaced apart washer plates contacting the rail and a metal bar supported by the washer plates, the wire bonding assembly laterally spaced from an insulated joint proximate an end of the rail;
   connecting the metal bar with the rail with a first conductive lead contacting a selected point on the rail between a first end of the metal bar and the insulated joint and a selected point on the metal bar;
   connecting a second conductive lead to another selected point on the metal bar for establishing an electrical connection to the rail from an electrical device; and
   wherein at least one of connecting the metal bar with the rail with a first conductive lead and connecting a second conductive lead to the metal bar comprises fastening an end of a corresponding one of the first and second conductive leads to the metal bar by a selected one of welding, brazing, and pin brazing processes.

2. The method of claim 1, wherein fastening the wire bonding assembly to the railroad rail comprises fastening the first and second washer plates to corresponding points on a web of the rail spacing a rail base and a rail head.

3. The method of claim 1, wherein the wire bonding plate assembly is fastened to the rail with first and second bolts extending through the first and second washer plates and corresponding points on the metal bar.

4. The method of claim 1, wherein the bonding plate assembly is fastened to the rail such that a first end of the metal bar is proximate the insulated joint.

5. The method of claim 1, wherein connecting the metal bar and the rail comprises contacting the metal bar with an end of the first conductive lead at a point proximate the first end of the metal bar.

6. The method of claim 4, wherein the first washer plate is fastened to the rail at a first point proximate the insulated joint and the second washer plate is fastened to the rail at a second point spaced from the first point by at least a portion of the length of the metal bar, and wherein the second washer plate is electrically insulated from the rail.

7. The method of claim 1, wherein connecting a second conductive lead to another selected point on the metal bar comprises connecting a track wire forming a portion of a track circuit system to the metal bar.

8. The method of claim 1, wherein connecting the metal bar with the rail comprises fastening an end of the first conductive lead to the selected point on the rail using a pin brazing process.

9. The method of claim 1, wherein connecting the metal bar with the rail comprises fastening an end of the first conductive lead to the metal bar using a process selected from the group consisting of welding, brazing, and a pin brazing process.

10. The method of claim 1, wherein connecting a second conductive lead to another selected point on the metal bar comprises fastening an end of the second conductive lead to another point on the metal bar using a process selected from the group consisting of welding, brazing, and a pin brazing process.

11. The method of claim 1, wherein fastening the wire bonding assembly to the railroad rail comprises fastening the wire bonding assembly to the railroad rail at a selected point on the rail and the method further comprises:
    fastening a second wire bonding assembly to a railroad rail at second selected location on the rail, the second wire bonding assembly including first and second spaced apart washer plates contacting the rail and a metal bar supported by the washer plates;
    connecting the metal bar of the second wire bonding assembly with the rail with a third conductive lead contacting a selected point on the rail and a selected point on the metal bar; and
    connecting a fourth conductive lead to a selected point on the metal bar for establishing another electrical connection to the rail from an electrical device.

12. The method of claim 11, wherein the bonding wire assembly and the another bonding wire assembly are fastened to the rail at selected points on the same side of the rail.

13. The method of claim 11, wherein the bonding wire assembly and the another bonding wire assembly are fastened to the rail at selected points on opposing sides of the rail.

14. A wire bonding assembly for establishing an electrical connection to a railroad rail, comprising:
    a plurality of support structures fastened to corresponding spaced apart points on a selected surface of a railroad rail, the plurality of support structures spaced from an insulated joint proximate an end of the rail;
    an elongated metal bar supported on the rail by the plurality of support structures;
    a first conductive lead having a first end connected to the rail at a point between a first end of the metal bar and the insulated joint and a second end fastened to the elongated bar;
    a second conductive lead for establishing electrical connection to the rail from an electrical device and having an end fastened to the elongated bar;
    wherein at least one of the second end of the first conductive lead and the end of the second conductive lead is fastened to the elongated bar by a selected one of a welded connection, a brazed connection, and a pin-brazed connection.

15. The wire bonding assembly of claim 14, wherein the plurality of support structures comprise washer plates.

16. The wire bonding assembly of claim 14, wherein at least one of the plurality of support structures is electrically insulated from the rail when fastened to the rail.

17. The wire bonding assembly of claim 14, wherein the plurality of support structures and the metal bar include apertures there through for receiving a bolt for fastening the wire bonding assembly to the rail.

18. The wire bonding assembly of claim 14, wherein the plurality of support structures are dimensioned to fasten the wire bonding assembly to a web of a railroad rail.

19. The wire bonding assembly of claim 14, wherein the metal bar is fabricated of steel.

\* \* \* \* \*